3,681,327
N-METHYLENETHIOPHOSPHATE DERIVATIVES
OF 1,3-THIAZINES AND 1,4-THIAZANES
Neil F. Newman, Matawan, N.J., assignor to Esso
Research and Engineering Company
No Drawing. Filed July 1, 1970, Ser. No. 51,687
Int. Cl. C07d 93/06, 93/10
U.S. Cl. 260—243 R         5 Claims

ABSTRACT OF THE DISCLOSURE

N-methylenethiophosphates of six-membered ring cyclic imides have been prepared which show marked insecticidal activity. These compounds can be characterized by the following structural formula:

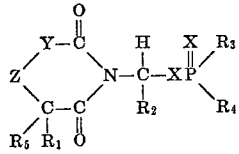

wherein $R_1$ and $R_5$ are selected from hydrogen, $C_1$ to $C_{16}$ alkyl, $C_6$ to $C_{10}$ aryl optionally substituted with chloro, bromo, nitro, or $C_1$ to $C_4$ alkyl; halo-substituted $C_1$ to $C_{16}$ alkyl, $C_1$ to $C_6$ alkoxy, $C_2$ to $C_6$ alkenyl, $C_2$ to $C_6$ alkynyl, $C_1$ to $C_4$ alkysulfoxide, nitrile, $C_1$ to $C_4$ alkylamino, $C_6$ to $C_{10}$ aryloxy, $C_1$ to $C_4$ carboalkoxy, $C_2$ to $C_4$ dialkylamino, nitro, $C_2$ to $C_6$ alkoxyalkyl, $C_2$ to $C_6$ alkylthioalkyl, bromo, chloro, $C_1$ to $C_6$ alkylthio and $C_1$ to $C_6$ alkylsulfonyl; $R_2$ is hydrogen, $C_1$ to $C_4$ alkyl optionally substituted with chloro or bromo, $R_3$ and $R_4$ can be the same or different and are $C_1$ to $C_6$ alkyl, $C_1$ to $C_6$ alkoxy, $C_6$ to $C_{10}$ aryloxy, $C_1$ to $C_6$ alkylthio, $C_1$ to $C_6$ haloalkyl, $C_6$ to $C_{10}$ aryl, $C_6$ to $C_{10}$ halo-substituted aryl, $C_7$ to $C_{11}$ arylalkyl, $C_6$ to $C_{10}$ arylthio, and $C_7$ to $C_{11}$ halo-substituted arylalkyl; X is either O or S; Y is either O or S or

and Z is either O, S, or

with the proviso that when Y is O or S, Z must be

and when Z is O or S, Y must be

This invention relates to novel substituted imides. In one aspect this invention relates to novel derivatives of N-substituted imides. In another aspect this invention relates to the use of novel phosphoric and thiophosphoric acid ester derivatives of N-substituted imides as pesticides.

It is an object of the present invention to provide new thiophosphoric and phosphoric acid derivatives of substituted imides which possess improved pesticidal activity;

It is another object of the subject invention to provide a novel pesticidal use for said compounds;

Other objects and many of the attendant advantages of this invention will be readily appreciated the same becomes better understood by reference to the following detailed description.

The compounds falling within the scope of this invention are characterized by the following structural formula:

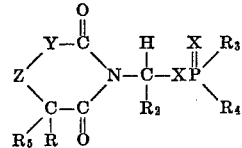

wherein $R_1$ and $R_5$ are selected from hydrogen, $C_1$ to $C_{16}$ alkyl, $C_6$ to $C_{10}$ aryl optionally substituted with chloro, bromo, nitro, or $C_1$ to $C_4$ alkyl; halo-substituted $C_1$ to $C_{16}$ alkyl, $C_1$ to $C_6$ alkoxy, $C_2$ to $C_6$ alkenyl, $C_2$ to $C_6$ alkynyl, $C_1$ to $C_4$ alkylsulfoxide, nitrile, $C_1$ to $C_4$ alkylamino, $C_6$ to $C_{10}$ aryloxy, $C_1$ to $C_4$ carboalkoxy, $C_2$ to $C_4$ dialkylamino, nitro, $C_2$ to $C_6$ alkoxyalkyl, $C_2$ to $C_6$ alkylthioalkyl, bromo, chloro, $C_1$ to $C_6$ alkylthio and $C_1$ to $C_6$ alkylsulfonyl; $R_2$ is hydrogen, $C_1$ to $C_4$ alkyl optionally substituted with chloro or bromo, $R_3$ and $R_4$ can be the same or different and are $C_1$ to $C_6$ alkyl, $C_1$ to $C_6$ alkoxy, $C_6$ to $C_{10}$ aryloxy, $C_1$ to $C_6$ alkylthio, $C_1$ to $C_6$ haloalkyl, $C_6$ to $C_{10}$ aryl, $C_6$ to $C_{10}$ halo-substituted aryl, $C_7$ to $C_{11}$ arylalkyl, $C_6$ to $C_{10}$ arylthio, and $C_7$ to $C_{11}$ halo-substituted arylalkyl; X is either O or S; Y is either O or S or

and Z is either O, S, or

with the proviso that when Y is O or S, Z must be

and when Z is O or S, Y must be

Specific examples of compounds falling within the scope of this invention are as follows:

Compound No.:
1. S-[glutarimidyl-N-methyl]-O, O-dimethyl phosphorothioate.
2. S-[3-methylglutarimidyl-N-methyl]-O, O-dimethyl phosphorothioate.
3. S-[2, 4-dioxo-1, 3-thiazanyl-3-methyl]-O, O-dimethyl phosphorothioate.
4. S-[2, 4-dioxo-1, 3-oxazanyl-3-methyl]-O, O-dimethyl phosphorothioate.
5. S-[3, 4-dioxo-1, 4-oxazanyl-4-methyl]-O, O-dimethyl phosphorothioate.
6. S-[3, 5-dioxo-1, 4-thiazanyl-4-methyl]-O, O-dimethyl phosphorothioate.
7. S-[3-phenylglutarimidyl-N-methyl]-O, O-dimethyl phosphorothioate.
8. S-[3-nitroglutarimidyl-N-methyl]-O, O-dimethyl phosphorothioate.
9. S-[3-chloroglutarimidyl-N-methyl]-O, O-dimethyl phosphorothioate.
10. S-[3-methoxyglutarimidyl-N-methyl]-O, O-dimethyl phosphorothioate.
11. S-[3-methylthioglutarimidyl-N-methyl]-O, O-dimethyl phosphorothioate.
12. S-[3-vinylglutarimidyl-N-methyl]-O, O-dimethyl phosphorothioate.
13. S-[3-propargylglutarimidyl-N-methyl]-O, O-dimethyl phosphorothioate.
14. S-[3-cyanoglutarimidyl-N-methyl]-O, O-dimethyl phosphorothioate.
15. S-[3-dimethylaminoglutarimidyl-N-methyl]-O, O-dimethyl phosphorothioate.
16. S-[2, 4-dioxo-5-methyl-1, 3-thiazanyl-3-methyl]-O, O-dimethyl phosphorothioate.

TABLE—Continued

| Compound No.: | |
|---|---|
| 17 | S-[2,4-dioxo-5-phenyl-1,3-thiazanyl-3-methyl]-O, O-dimethyl phosphorothioate. |
| 18 | S-[2,4-dioxo-5-nitro-1,3-thiazanyl-3-methyl]-O, O-dimethyl phosphorothioate. |
| 19 | S-[2,4-dioxo-5-bromo-1,3-oxazanyl-3-methyl]-O, O-dimethyl phosphorothioate. |
| 20 | S-[2,4-dioxo-5-methoxy-1,3-oxazanyl-3-methyl]-O, O-dimethyl phosphorothioate. |
| 21 | S-[2,4-dioxo-5-cyano-1,3-oxazanyl-3-methyl]-O, O-dimethyl phosphorothioate. |
| 22 | S-[3,5-dioxo-2-methyl-1,4-thiazanyl-4-methyl]-O, O-dimethyl phosphorothioate. |
| 23 | S-[3,5-dioxo-2-phenyl-1,4-oxazanyl-4-methyl]-O, O-dimethyl phosphorothioate. |
| 24 | S-[3,5-dioxo-2-nitro-1,4-thiazanyl-4-methyl]-O, O-dimethyl phosphorothioate. |
| 25 | S-[3,5-dioxo-2-chloro-1,4-oxazanyl-4-methyl]-O, O-dimethyl phosphorothioate. |
| 26 | S-1-[2,4-dioxo-1,3-thiazanyl-3-(1-ethyl)]-O, O-dimethyl phosphorothioate. |
| 27 | S-1-[2,4-dioxo-1,3-thiazanyl-3-(1-β-chloroethyl)]-O, O-dimethyl phosphorothioate. |
| 28 | O-[2,4-dioxo-1,3-thiazanyl-3-methyl]-O, O-dimethyl phosphate. |
| 29 | O-[glutarimidyl-N-methyl]-O, O-dimethyl phosphorothioate. |
| 30 | S-[3,5-dioxo-1,4-thiazanyl-4-methyl]-O, O-diethyl phosphorothioate. |
| 31 | S-[3,5-dioxo-1,4-oxazanyl-4-methyl]-O, O-diphenyl phosphorothioate. |
| 32 | S-[2,4-dioxo-1,3-oxazanyl-3-methyl]-S-n-propyl-O-ethyl phosphorodithioate. |
| 33 | S-[3-methylglutarimidyl-N-methyl]-O-ethyl ethyl phosphonate. |
| 34 | S-[glutarimidyl-N-methyl]-S, S-diethyl phosphorotrithioate. |
| 35 | S-[2,4-dioxo-1,3-thiazanyl-3-methyl]-S, S-diethyl phosphorotetrathioate. |
| 36 | S-[2,4-dioxo-1,3-thiazanyl-3-methyl]-O, O-diethyl phosphorodithioate. |

The compounds falling within the scope of this invention can be prepared by the following process which is represented schematically as follows:

REACTION 1A:

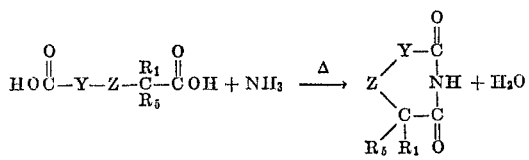

This reaction is well known in the literature and, for instance, is described in Org. Syn. Coll. vol. II, pp. 562–563, John Wiley & Sons, London, England, 1943.

REACTION 1B:

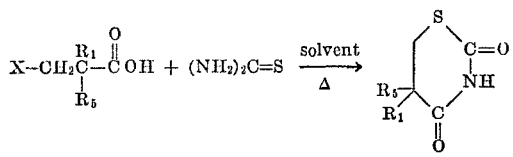

In the above reaction the X can be selected from the group consisting of chlorine, bromine and iodine and is preferably chlorine. The mole ratios of the thiourea to the halo-acid can range from 0.5:1.5 and is preferably 1.0. The solvent can be any one selected from the groups consisting of hydrocarbons, halocarbons, organic acids and carboxylic anhydrides. Preferably the solvent is acetic acid. The temperature in which the reaction is conducted ranges from 0–200° C. and preferably from 50–150° C. The pressure ranges from 1–100 atmospheres and preferably from 1–10 atmospheres.

REACTION 2:

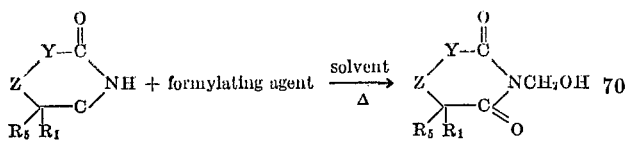

In the above reaction the formylating agent is selected from formaldehyde gas, Formalin and paraformaldehyde. Preferably the agent is aqueous formaldehyde. The moles of formylating agent to the moles of imide range from 1.0:1 to 10.0:1, preferably from 1.5:1 to 6.0:1. The solvents for this reaction are selected from the groups consisting of water, alcohols, dimethylformamide and dimethylsulfoxide, preferably the solvent is water. The temperature ranges from 0°–200° C., preferably from 50°–150° C. and the pressure ranges from 1–100 atmospheres, preferably from 1–10 atmospheres.

REACTION 3:

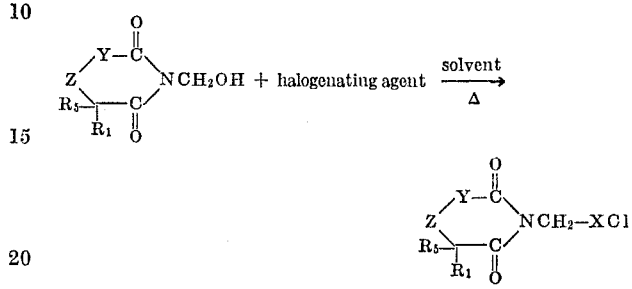

The halogenating agent in the above reaction is selected from the group consisting of hydrochloric acid, thionyl chloride, phosphorus tribromide, sulfuryl chloride, and phosphorus pentachloride. Preferably the solvent is thionyl chloride. The mole ratios of halogenating agent to imide range from 1.0:1 to 5.0:1, preferably 1.5:1 to 3.0:1. The solvent for this reaction is selected from the hydrocarbons, halocarbons and ethers, preferably chloroform is employed. The temperature ranges from −30° to +200° C., preferably from 0° to 80° C. The pressure ranges from 1–100 atmospheres, preferably from 1–10 atmospheres.

REACTION 4:

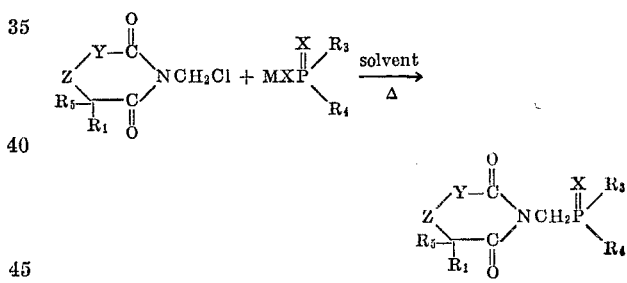

M+=NH4, K or Na

The moles of phosphorus salt/mole of imide ranges from 1.0:1 to 1.5:1, preferably from 1.0:1 to 1.1:1. The solvent for this reaction was selected from the hydrocarbons, halocarbons, ethers, alkylnitriles, dimethylformamide and dimethylsulfoxide, preferably the solvent is acetonitrile. The temperatures range from 0–200 C., preferably from 0–100° C. and the pressure ranges from 1–100 atmospheres, preferably from 1–10 atmospheres.

Insecticidal compositions of the invention are prepared by admixing one or more of the active ingredients defined heretofore, in insecticidally effective amounts with a conditioning agent of the kind used and referred to in the art as a pest control adjuvant or modifier to provide formulations adapted for ready and efficient application using conventional applicator equipment.

Thus, the insecticidal compositions or formulations are prepared in the form of solids or liquids. Solid compositions are preferably in the form of granulars or dusts.

The compositions can be compounded to give homogeneous free-flowing dusts by admixing the active compound or compounds with finely-divided solids, preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by adsorbing the compound in liquid form onto a preformed granular diluent.

Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50% by weight or more concentration of the active ingredient can be obtained in solution.

The insecticidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the ionic nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The active compound is, of course, applied in an amount sufficient to exert the desired pesticidal action. The amount of the active compound present in the compositions as actually applied for destroying pests will vary with the manner of application, the particular pests for which control is sought, the purpose for which the application is being made, and like variables. In general, the pesticidal compositions as applied in the form of a spray, dust or granular, will contain from about 0.1% to 100% by weight of the active compound.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the present compounds.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and lighter concentrations can be applied if necessary.

The compositions of this invention can also be formulated as dusts. These comprise an intimate admixture of the active ingredient and a finely-powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely-powdered carrier, which can be of lower sorptive capacity, to a concentration suitable for application.

The compositions of the invention can be formulated as wettable powders comprising a major proportion of the active ingredient mixed with a dispersing, i.e., defluocculating or suspending agent, and if desired, a finely-divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., defluocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely-divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols, ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a non-aqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

EXAMPLE I

Preparation of S-[2,4-dioxo-1,3-thiazanyl-3-methyl]-O,O-dimethyl phosphorothioate 3-chloropropionic acid (382 g. 3.5 moles) and 2.66 g. (3.5 moles) of thiourea were dissolved in 3000 ml. of acetic acid and refluxed for six days. The hot solution was then decanted from the precipitate and cooled with stirring to crystallize 164 g. (25%) of pale yellow solid (2,4-dioxo-1,3-thiazane), M.P.=159–164°. After recrystallizing from acetic acid the melting point was raised to 163–166°. Structure confirmed by NMR.

*Analysis.* Calc. (percent): C, 36.9; H, 3.08. Found (percent): C, 36.8; H, 3.09.

2,4-dioxo-1,3-thiazane (82 g. 0.51 mole) was dissolved in 260 ml. of 37% formaldehyde (5 equiv. of $CH_2=O$) containing 1 ml. of conc. aqueous HCl. The solution was refluxed for 5 hours, then cooled to 25° and stripped of solvent on a rotary evaporator. The whitish oil residue was extracted once with an equal volume of hot chloroform and the 2-phase system was filtered. The chloroform layer was isolated from the filtrate and dried over magnesium sulfate. After filtering to remove the drying agent, the chloroform was stripped on a rotary evaporator to give 82 g. (98%) of clear pale yellow oil (3-hydroxymethyl-2,4-dioxo-1,3-thiazane). This structure of the product was confirmed by infrared and NMR spectra.

3 - hydroxymethyl-2,4-dioxo-1,3-thiazane (80.2 g. 0.50 mole) was dissolved in 400 ml. of chloroform. To this solution was added dropwise 71 ml. (2 equiv.) of thionyl chloride. After completing the addition the mixture was heated to reflux and held at reflux for 2 hours. The mixture was then cooled to 25° and the chloroform was removed on a rotary evaporator. Toluene (100 ml.) was added to the residue and removed on a rotary evaporator to obtain 66.6 g. (75%) of yellow oil (3-chloromethyl-2,4-dioxo-1,3-thiazane). The structure was confirmed by IR and NMR spectra.

3 - chloromethyl-2,4-dioxo-1,3-thiazane (25 g. 0.139 mole) was dissolved in 250 ml. of acetonitrile. Ammonium dimethylmonothiophosphate (1.1 equiv.) was added all at once and the mixture was stirred at reflux for 2 hours. After filtering, the solvent was removed on a rotary evaporator and the residue was taken up in five volumes of chloroform and extracted twice with one volume of water. The organic layer was dried over magnesium sulfate and filtered. The chloroform was removed on a rotary evaporator and the residue was "topped" by distilling at 100° C./0.1 mm. Hg to remove 4.0 g. of by-product trimethyl monothiophosphate. The residue from this "topping' was 25 g. (70%) of viscous yellow oil, identified as S-[2,4 - dioxo - 1,3-thiazanyl-3-methyl]-O,O-dimethyl phosphorothioate by NMR and IR spectra.

EXAMPLE II

Preparation of S-[2,4-dioxo-1,3-thiazanyl-3-methyl]-O-ethyl-S-propyl phosphorodithioate The procedure of Example I was followed in all particulars with the exception that the phosphorylating agent was changed to potassium O - ethyl-S-propyl dithiophosphate and the "topping" distillation stage was omitted. Thus was obtained 25 g. (55%) of yellow oil which was identified as S-[2,4-dioxo-1,3-thiazanyl-3-methyl]-O-ethyl-S-propyl phosphorodithioate by its NMR and IR spectra.

EXAMPLE III

The following organophosphates were prepared according to the procedure given in Example I. The starting imides for the following phosphates were prepared either by the well-known pyrolysis of the ammonium salt of the appropriate diacid or by the thiourea-haloacid condensation described above.

Compound name

S-[glutarimidyl-N-methyl]-O,O-dimethyl phosphorothioate
S[glutarimidyl-N-methyl]-O-ethyl-S-n-propyl phosphorodithioate
S-[3,5-dioxo-1,4-oxazanyl-4-methyl]-O,O-dimethyl phosphorothioate
S-[3,5-dioxo-1,4-oxazanyl-4-methyl]-O-ethyl-S-n-propyl phosphorodithioate
S-[3-methylglutarimidyl-N-methyl]-O,O-dimethyl phosphorothioate
S-[3-methylglutarimidyl-N-methyl]-O-ethyl-S-n-propyl phosphorodithioate S-[3,5-dioxo-1,4-thiazanyl-4-methyl]-O,O-dimethyl phosphorothioate
S-[3,5-dioxo-1,4-thiazanyl-4-methyl]-O-ethyl S-n-propyl phosphorodithioate
S-[2,4-dioxo-1,3-thiazanyl-3-methyl]-O,O-dimethyl phosphorothioate
S-[2,4-dioxo-1,3-thiazanyl-3-methyl]-O-ethyl S-n-propyl phosphorodithioate.

EXAMPLE IV

The new compounds of the subject invention were applied to insects in the greenhouse and in the laboratory to determine their biological activity.

The experimental compounds were tested as aqueous emulsions. These emulsions were prepared by dissolving the compound in acetone and dispersing it in distilled water with Triton X-100 an alkylaryl polyether alcohol derived by the reaction of 1-octylphenol with ethylene oxide to give spray emulsions containing the desired concentration of the compound. These emulsions were then used in standard laboratory tests described below.

Mexican bean beetle

Bean leaves were dipped in the emulsion of the test chemical and allowed to dry. The individually treated leaves were placed in Petri dishes and 5 Mexican bean beetle larvae introduced into each of two replica dishes.

Mite contact

Potted bean plants infested with the two spotted spidermites were placed on a turntable and sprayed with a formulation of the test chemical. The plants were held for 7 days and the degree of mite control was rated after this period.

Mites systemic

Bean plants were treated by applying 20 milliliters of the formulated test chemical to the soil. The mites were transferred to the plants after 24 hours. Plants were held for 7 more days and the degree of mite control rated.

Aphid contact

Potted nasturtium plants infested with the bean aphids were placed on a turntable and sprayed with a formulation of the test chemical. The plants were held for two days and the degree of aphid control was rated.

Aphid systemic

Nasturtium plants are treated by applying 20 milliliters of the formulated test chemical to the soil. The mites were transferred to the plant after 24 hours. The plants were held for 48 additional hours and the degree of the aphid control rated.

Typical results of the tests are as follows:

TABLE I.—INSECTICIDAL ACTIVITY

| Compound name | Conc. (p.p.m.) | Mexican bean beetle larvae | Mite contact | | Mite systemic | | Aphid | |
|---|---|---|---|---|---|---|---|---|
| | | | Adult | Nymph | Adult | Nymph | Contact | Systemic |
| S-[glutarimidyl-N-methyl]-O,O-dimethyl phosphorothioate [1] | 250 | 10 | 9 | 10 | 10 | 10 | 10 | 10 |
| S-[glutarimidyl-N-methyl]-O-ethyl S-n-propyl phosphorodithioate | 250 | 10 | 10 | 10 | 10 | 10 | 10 | 2 |
| S-[3,5-dioxo-1,4-oxazanyl-4-methyl]-O,O-dimethyl phosphorothioate | 250 | 10 | 9 | 10 | 10 | 9 | 10 | 10 |
| S-[3,5-dioxo-1,4-oxazanyl-4-methyl]-O-ethyl S-n-propyl phosphorodithioate | 250 | 10 | 10 | 8 | 8 | 9 | 10 | 4 |
| S-[3-methylglutarimidyl-N-methyl]-O,O-dimethyl phosphorothioate | 250 | 10 | 10 | 10 | 10 | 10 | 10 | 3 |
| S-[3-methylglutarmidyl-N-methyl]-O-ethyl S-n-propyl phosphorodithioate | 250 | 10 | 10 | 10 | 9 | 8 | 5 | 9 |
| S-[3,5-dioxo-1,4-thiazanyl-4-methyl]-O,O-dimethyl phosphorothioate | 250 | 10 | 10 | 10 | 8 | 8 | 2 | 10 |
| S-[3,5-dioxo-1,4-thiazanyl-4-methyl]-O-ethyl S-n-propyl phosphorodithioate | 250 | 10 | 10 | 9 | 10 | 10 | 6 | 10 |
| S-[2,4-dioxo-1,3-thiazanyl-3-methyl]-O,O-dimethyl phosphorothioate | 250 | 10 | 9 | 10 | 9 | 10 | 9 | 10 |
| S-[2,4-dioxo-1,3-thiazanyl-3-methyl]-O-ethyl S-n-propyl phosphorodithioate | 250 | 10 | 10 | 10 | 10 | 10 | 9 | 10 |

[1] Acute oral toxicity: $LD_{50}$ (est.) = 70 mg./kg.

NOTE.—The amount of control is rated on a scale of 0–10, where 0=no control, 10=complete control.

What is claimed is:
1. A compound of the formula:

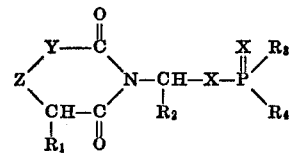

wherein $R_1$ is hydrogen, $C_1$ to $C_{16}$ alkyl, phenyl or nitro; $R_2$ is hydrogen or $C_1$ to $C_4$ alkyl optionally substituted with chloro or bromo; each of $R_3$ and $R_4$ is $C_1$ to $C_6$ alkoxy or $C_1$ to $C_6$ alkylthio; each X is oxygen or sulfur; one of Y and Z is sulfur and the other is

2. A compound according to claim 1, which is S-[3,5-dioxo-1,4-thiazanyl-4 - methyl]-O,O-dimethyl phosphorothioate.

3. A compound according to claim 1, which is S-[3,5-dioxo-1,4-thiazanyl-4 - methyl]-O-ethyl S-n-propyl phosphorodithioate.

4. A compound according to claim 1, which is S-[2,4-dioxo-1,3-thiazanyl-3 - methyl]-O,O-dimethyl phosphorothioate.

5. A compound according to claim 1, which is S-[2,4-dioxo - 1,3 - thiazanyl-3-methyl]-O-ethyl S-n-propyl phosphorodithioate.

References Cited

UNITED STATES PATENTS 3,408,348  10/1968  Martin et al. _____ 260—243

JOHN M. FORD, Primary Examiner

U.S. Cl. X.R.

260—244 R, 281; 424—246, 248